No. 752,711.  
PATENTED FEB. 23, 1904.
W. H. ROSE.  
TORCH.  
APPLICATION FILED JAN. 20, 1902.  
NO MODEL.
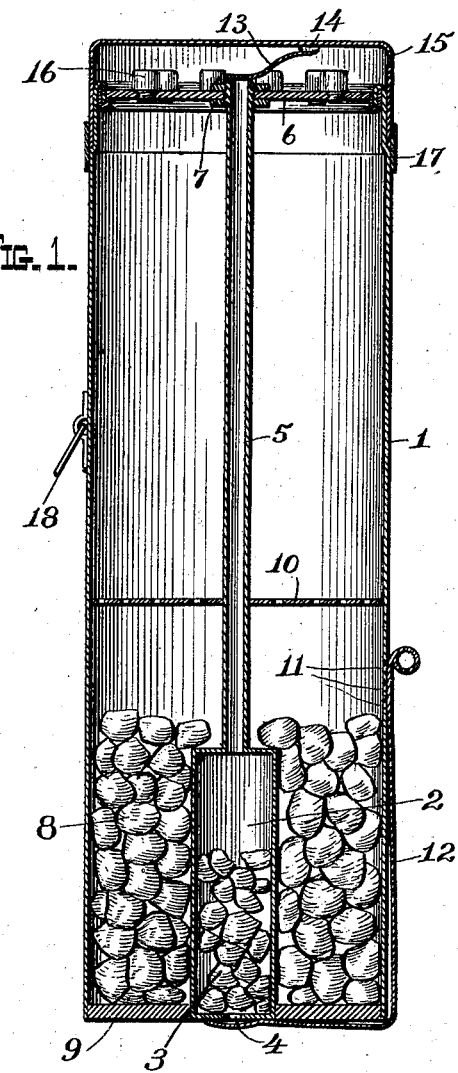
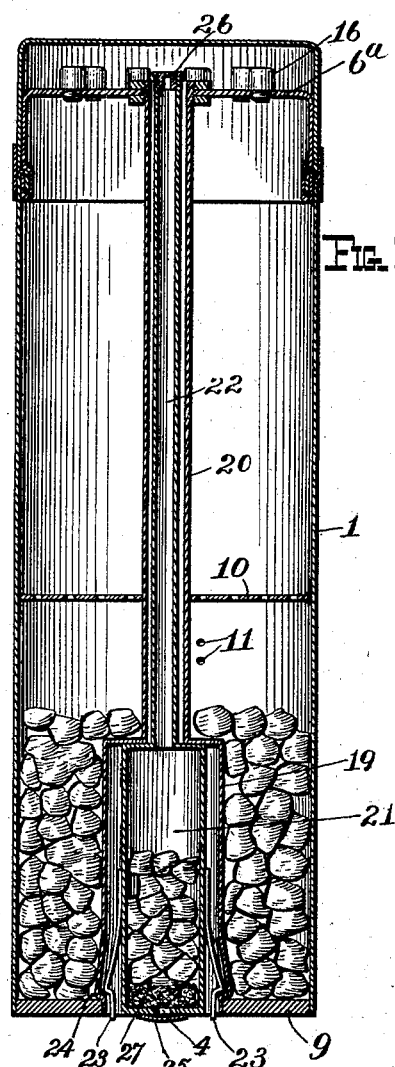
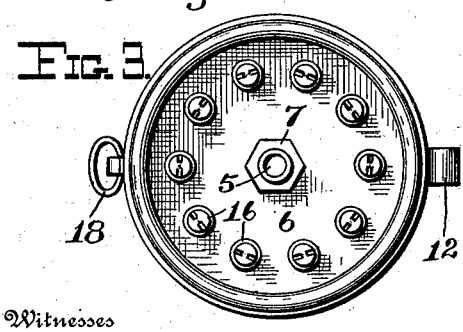
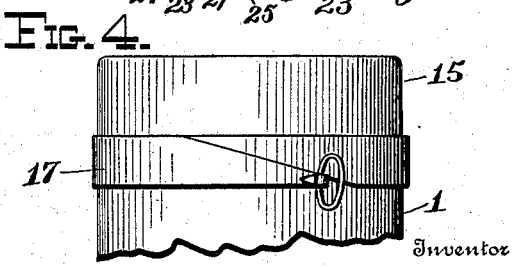
Witnesses  
Percy C. Bowen  
Arthur L. Bryant
Inventor  
William H. Rose  
By Watson & Watson  
Attorneys No. 752,711. Patented February 23, 1904.

UNITED STATES PATENT OFFICE.

WILLIAM H. ROSE, OF BALTIMORE, MARYLAND, ASSIGNOR TO THE MARINE TORCH COMPANY OF BALTIMORE CITY, OF BALTIMORE, MARYLAND.

TORCH.

SPECIFICATION forming part of Letters Patent No. 752,711, dated February 23, 1904.

Application filed January 20, 1902. Serial No. 90,512. (No model.)

*To all whom it may concern:*

Be it known that I, WILLIAM H. ROSE, a citizen of the United States, residing at the city of Baltimore, State of Maryland, have invented certain new and useful Improvements in Torches, of which the following is a specification.

The present invention is an improvement upon the torch illustrated and described in Letters Patent No. 647,610, issued to Rose and Holmes on April 17, 1900. In said patented torch the chamber containing the igniter is situated in the upper end of the torch and the torch must be completely submerged in order that the igniting material may come in contact with water, which is necessary to its operation. In the present invention the compartment containing the igniting material is situated in the lower part of the torch and is normally under water when the torch is afloat. The torch is therefore more certain in its operation, inasmuch as the water reaches the igniter in all cases and immediately after the torch is launched.

The invention will be more fully described in connection with the accompanying drawings, in which—

Figure 1 is a central vertical section of a complete torch, including the sealing devices. Fig. 2 is a similar section, illustrating a different form of the invention. Fig. 3 is a plan view of the torch in Fig. 1, the cap being removed; and Fig. 4 is a side elevation of the upper end of the torch shown in Fig. 1.

Referring to Figs. 1, 3, and 4 of the drawings, 1 indicates a cylindrical casing, forming the body of the torch. Within the lower part of the casing 1 is a smaller casing inclosing a compartment 2, which contains the igniting material 3, usually phosphid of calcium. The phosphid vessel has an opening 4 in its lower end, through which water may enter, and there is a passage 5 in a tube leading from its upper end to and through the upper end plate 6 of the body 1, being connected to said end plate by lock-nuts 7. The carbid of calcium 8, which supplies the illuminating-gas, is arranged in the bottom of the larger casing surrounding the phosphid-chamber. In addition to the weight of the carbid and phosphid the bottom 9 of the torch is preferably weighted to cause the torch to float upright. The upper portion of the casing 1 is empty, rendering the torch buoyant, and a perforated diaphragm 10 is preferably provided to keep the carbid of calcium in its proper place at the lower end of the torch. Perforations 11 are provided for admitting water to the carbid of calcium when the torch is afloat. When the torch is charged, the openings 4 and 11 are sealed temporarily to prevent the moisture of the atmosphere from attacking the phosphid and carbid of calcium. The sealing of these openings is preferably accomplished, as shown in Fig. 1, by means of a single strip 12, which can be torn off quickly when the torch is to be used. The upper end of the passage 5 is also temporarily sealed by suitable means. As shown in Fig. 1, it is sealed by a strip or plate 13, which is connected by solder or otherwise at 14 with the cap 15, which closes the upper end of the main casing 1 to prevent moisture from entering through the burners 16. The burners may be of any form suitable for burning acetylene gas. The cap 15 fits over the casing, and its joint, with the casing, is hermetically sealed by a peel-off strip 17. A ring 18 (shown in Figs. 1 and 2) may be connected to the torch for the purpose of suspending it in any convenient place in a vessel or building, where it may be stored ready for use.

The operation of the torch above described is as follows: The torch, charged and sealed, as shown in Fig. 1, may be kept indefinitely ready for use. When it is desired to use the torch, the strips 12 and 17 are torn off and the cover 15 is removed, the seal 13 coming off with the cover. If the torch is to be used as a floating light, it need only be thrown into the water. The water will immediately enter both the phosphid and carbid chambers. Acetylene gas will be quickly generated and discharged through the burners. Phosphoreted hydrogen will be discharged through the passage 5, and immediately on reaching the atmosphere at a point adjacent to the burners it will take fire, and the flame thus produced will ignite the acetylene gas at the burners.

If the torch is to be used on land, it should be placed in a bucket or other vessel containing water. The torch when ignited cannot be extinguished, except for a moment at a time, until the carbid is exhausted. The torch is therefore very valuable for illuminating at sea in case of shipwreck or other accident and also for illuminating the interior of burning buildings and other places where an ordinary light could not be depended upon.

In Fig. 2 is shown a torch having a removable phosphid vessel. This form of torch is provided with a chamber 19, from which a tube 20 extends to the upper end $6^a$. The phosphid vessel 21 fits within the chamber 19, and it is provided with a discharge-tube 22, adapted to pass up through the tube 20 and to discharge the phosphoreted hydrogen in the neighborhood of the burners 16. The phosphid vessel is removably locked within the chamber 19 by a suitable device—as, for instance, the spring-latches 23, which engage shoulders 24 in the wall of the chamber 19. The opening 4 in the bottom of the phosphid vessel is closed by the seal 25, and the perforations 11 are in this instance closed by a separate seal. (Not shown.) The upper end of tube 22 is also provided with a seal—as, for instance, the screw-cap 26. The phosphid vessel being removable renders it possible to store the phosphid and carbid compartments separately. It is even more necessary to keep moisture from the phosphid than to keep it from the carbid, and for that reason it is sometimes found preferable to store the phosphid vessels by themselves secure from dampness. To regulate the supply of water to the phosphid vessel, a wad of cotton or other fibrous or porous material 27 is preferably placed in the bottom of the phosphid vessel.

In the construction shown in Fig. 1 the plate 6 is connected to the upper end of the body 1, while in the construction shown in Fig. 2 the head $6^a$ is cup-shaped and its lower edge is interlocked with the upper end of the body 1 at a point considerably below the end plate 6.

The various parts may be constructed of sheet metal and joined in any suitable manner.

Having thus described my invention, what I claim as new, and desire to secure by Letters Patent, is—

1. A torch comprising a shell having a compartment charged with illuminating material, a burner at the upper end of the shell and communicating with the said compartment, and a pilot-light for the burner consisting of a second compartment charged with phosphid of calcium, said phosphid-compartment being located at the bottom of the shell and provided with a water-inlet and with an outlet-passage leading up to the top of the shell and discharging in proximity to the burner.

2. A marine torch comprising a floatable shell having a compartment charged with carbid of calcium and an opening to admit water to said compartment, a gas-burner in communication with said compartment, and a pilot-light for said burner consisting of a second and smaller compartment charged with phosphid of calcium, said phosphid-compartment being located at the bottom of the shell and being provided with a water-inlet and with a passage leading up to and discharging adjacent to the burner.

3. A torch comprising a shell having a burner at its upper end and a compartment at its lower end charged with carbid of calcium, and provided with a water-inlet, a chamber formed within the lower part of the shell communicating with openings in the bottom and top thereof, a phosphid vessel removably held in said chamber, and means for admitting water to said phosphid vessel and for conducting phosphoreted hydrogen from said vessel to the burner, for the purpose set forth.

4. A torch comprising a floatable shell having at its lower end a compartment charged with carbid of calcium and provided with a water-inlet, and at its upper end a burner for acetylene gas, a chamber in the lower end of the shell which is sealed from the carbid-compartment and which communicates with an opening in the bottom of the shell, a tube connecting said chamber with an opening in the top of the shell adjacent to the burner, a phosphid vessel adapted to be secured in said chamber, a tube extending from the phosphid vessel through the above-mentioned tube and into proximity with the burner, and means for admitting water to the phosphid vessel, for the purpose set forth.

In testimony whereof I affix my signature in presence of two witnesses.

WILLIAM H. ROSE.

Witnesses:
BERNARD A. SCHMITZ,
FRANK M. MERRIKEN.